(12) United States Patent
Demir et al.

(10) Patent No.: US 10,753,436 B2
(45) Date of Patent: Aug. 25, 2020

(54) TENSIONER

(71) Applicant: Gates Corporation, Denver, CO (US)

(72) Inventors: Erman Demir, Izmir (TR); Sarp Cankul, Ismir (TR); David W. Fisher, Denver, CO (US); Ahmet Guclu, Izmir (TR)

(73) Assignee: Gates Corporation, Denver, CO (US)

( * ) Notice: Subject to any disclaimer, the term of this patent is extended or adjusted under 35 U.S.C. 154(b) by 239 days.

(21) Appl. No.: 16/013,608

(22) Filed: Jun. 20, 2018

(65) Prior Publication Data
US 2019/0390749 A1    Dec. 26, 2019

(51) Int. Cl.
*F16H 7/12* (2006.01)
*F16H 7/08* (2006.01)

(52) U.S. Cl.
CPC ..... *F16H 7/1281* (2013.01); *F16H 2007/081* (2013.01); *F16H 2007/088* (2013.01); *F16H 2007/0844* (2013.01); *F16H 2007/0865* (2013.01); *F16H 2007/0893* (2013.01)

(58) Field of Classification Search
CPC ............. F16H 2007/081; F16H 7/1281; F16H 2007/0846; F16H 2007/0844; F16H 7/1218
USPC .................................................. 474/112, 135
See application file for complete search history.

(56) References Cited

U.S. PATENT DOCUMENTS

| | | | |
|---|---|---|---|
| 4,832,665 A * | 5/1989 | Kadota ................. | F16H 7/1227 474/112 |
| 4,906,222 A * | 3/1990 | Henderson ............ | F16H 7/1218 474/135 |
| 5,030,171 A * | 7/1991 | Henderson ............ | F16H 7/1218 474/135 |
| 5,207,620 A * | 5/1993 | Yamamoto ............ | F16H 7/1236 474/110 |
| 5,244,438 A * | 9/1993 | Golovatai ................. | F01L 1/02 474/112 |
| 5,266,067 A * | 11/1993 | Gapco ................... | F16H 7/1281 474/112 |

(Continued)

FOREIGN PATENT DOCUMENTS

| DE | 4209914 A1 | 9/1993 |
|---|---|---|
| DE | 102008024098 A1 | 11/2009 |

OTHER PUBLICATIONS

European Patent Office, International Search Report and Written Opinion of the International Searching Authority, International Application No. PCT/US2019/032561, dated Jul. 3, 2019.

*Primary Examiner* — Henry Y Liu
(74) *Attorney, Agent, or Firm* — Paul N. Dunlap, Esq.

(57) ABSTRACT

A tensioner comprising a base having a shaft, an adjusting member rotatably engaged within the shaft, a pivot arm pivotally engaged with a shaft exterior, a torsion spring engaged between the base and the pivot arm, a pulley journalled to the pivot arm, a pulley axis of rotation B-B that is laterally offset from a pivot arm pivot axis A-A, the adjusting member configured for rotation about a fastener having an axis C-C, the axis C-C is laterally offset from the axis A-A, and a rotary member rotationally engaged with the pivot arm, the rotary member in a first position allows rotation of the adjusting member about the fastener, and upon rotation of the rotary member to a second position the rotary member limits movement of the pivot arm in a predetermined range with respect to the adjusting member.

4 Claims, 3 Drawing Sheets

(56) References Cited

U.S. PATENT DOCUMENTS

| | | | | |
|---|---|---|---|---|
| 5,470,279 A * | 11/1995 | Brandenstein | F16H 7/1281 | 474/135 |
| 5,496,221 A * | 3/1996 | Gardner | F16H 7/1281 | 474/135 |
| 5,919,107 A * | 7/1999 | Stepniak | F16H 7/1281 | 474/112 |
| 6,149,542 A * | 11/2000 | Lehtovaara | F16H 7/12 | 29/888.01 |
| 6,165,091 A * | 12/2000 | Dinca | F16F 9/145 | 474/101 |
| 6,416,435 B1 * | 7/2002 | Szatkowski | F16H 7/129 | 192/47 |
| 7,285,065 B2 * | 10/2007 | Dinca | F16H 7/1281 | 474/112 |
| 7,637,829 B2 * | 12/2009 | Stone | F16H 7/1281 | 474/109 |
| 7,918,755 B2 * | 4/2011 | Baumuller | F16H 7/1281 | 474/112 |
| 8,272,983 B2 * | 9/2012 | Rolando | F16H 7/1218 | 474/112 |
| 8,292,765 B2 * | 10/2012 | Rolando | F16H 7/1245 | 184/6.17 |
| 8,641,564 B2 * | 2/2014 | Rolando | F16H 7/1218 | 474/112 |
| 9,239,097 B2 * | 1/2016 | Lescorail | F16H 7/1281 | |
| 9,464,698 B2 * | 10/2016 | Mennerat | F16H 7/12 | |
| 9,643,302 B2 * | 5/2017 | Staley | F16H 7/12 | |
| 9,726,051 B2 * | 8/2017 | Frankowski | F16F 7/06 | |
| 9,869,379 B2 * | 1/2018 | Frankowski | F16H 7/0831 | |
| 10,323,731 B2 * | 6/2019 | Tronquoy | F16H 7/1281 | |
| 2004/0180745 A1 * | 9/2004 | Dinca | F16H 7/1281 | 474/135 |
| 2006/0068957 A1 * | 3/2006 | Stone | F16H 7/1281 | 474/135 |
| 2008/0153642 A1 * | 6/2008 | Baumuller | F16H 7/1281 | 474/101 |
| 2008/0287233 A1 * | 11/2008 | Cantatore | F16H 7/1218 | 474/112 |
| 2012/0316018 A1 * | 12/2012 | Ward | F16H 7/1218 | 474/135 |

* cited by examiner

TENSIONER

FIELD OF THE INVENTION

The invention relates to a tensioner, and more particularly, to a tensioner having a rotary member rotationally engaged with the pivot arm, the rotary member in a first position allows rotation of the adjusting member about the fastener, and upon rotation of the rotary member to a second position the rotary member limits movement of the pivot arm in a predetermined range with respect to the adjusting member.

BACKGROUND OF THE INVENTION

Belt tensioners are generally well known devices used in various belt-drive systems. The tensioner applies a constant belt-tensioning force, which compensates for increases in belt length due to wear and other factors. A common type of belt tensioner comprises a base and a pivot structure eccentrically mounted on the base. The pivot structure has a belt-engaging pulley journalled thereto. A torsion spring is connected between the base and pivot arm to bias the pivot arm and thereby impart a load on a belt.

Various techniques are used to install timing belt tensioners on engines. One of the most commonly used techniques is to use an eccentric adjusting member that forms part of the base. The eccentric adjusting member rotates around a mounting bolt and thereby moves the pivot arm toward or away from the belt. A known installation procedure includes mounting the tensioner on the engine with the eccentric member at the end of range away from the belt, routing the belt into the drive system, rotating the eccentric member towards the belt until the tensioner reaches the nominal operating position, and locking the tensioner with the mounting bolt.

Representative of the art is U.S. Pat. No. 7,285,065 which discloses a belt tensioner for tensioning the belt of a belt drive system includes an eccentric adjusting member, a pivot structure eccentrically mounted on the adjusting member for pivoting around the adjusting member, a belt-tensioning pulley mounted to rotate on the pivot structure, a biasing member that resiliently biases the pivot structure in a belt-tightening direction, and a coupling structure. The coupling structure temporarily couples the pivot structure to the adjusting member to pivot with it during a belt installation procedure, and the configuration keeps the coupling structure unloaded except for a limited period of time during the installation procedure such that the coupling structure can be installed and removed easily. The tensioner is rendered operative after the pivot structure is uncoupled from the adjusting member, thus allowing the pivot structure to pivot with respect to the adjusting member.

What is needed is a tensioner having a rotary member rotationally engaged with the pivot arm, the rotary member in a first position allows rotation of the adjusting member about the fastener, and upon rotation of the rotary member to a second position the rotary member limits movement of the pivot arm in a predetermined range with respect to the adjusting member.

SUMMARY OF THE INVENTION

The primary aspect of the invention is to provide a tensioner having a rotary member rotationally engaged with the pivot arm, the rotary member in a first position allows rotation of the adjusting member about the fastener, and upon rotation of the rotary member to a second position the rotary member limits movement of the pivot arm in a predetermined range with respect to the adjusting member.

Other aspects of the invention will be pointed out or made obvious by the following description of the invention and the accompanying drawings.

The invention comprises a tensioner comprising a base having a shaft, an adjusting member rotatably engaged within the shaft, a pivot arm pivotally engaged with a shaft exterior, a torsion spring engaged between the base and the pivot arm, a pulley journalled to the pivot arm, a pulley axis of rotation B-B that is laterally offset from a pivot arm pivot axis A-A, the adjusting member configured for rotation about a fastener having an axis C-C, the axis C-C is laterally offset from the axis A-A, and a rotary member rotationally engaged with the pivot arm, the rotary member in a first position allows rotation of the adjusting member about the fastener, and upon rotation of the rotary member to a second position the rotary member limits movement of the pivot arm in a predetermined range with respect to the adjusting member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
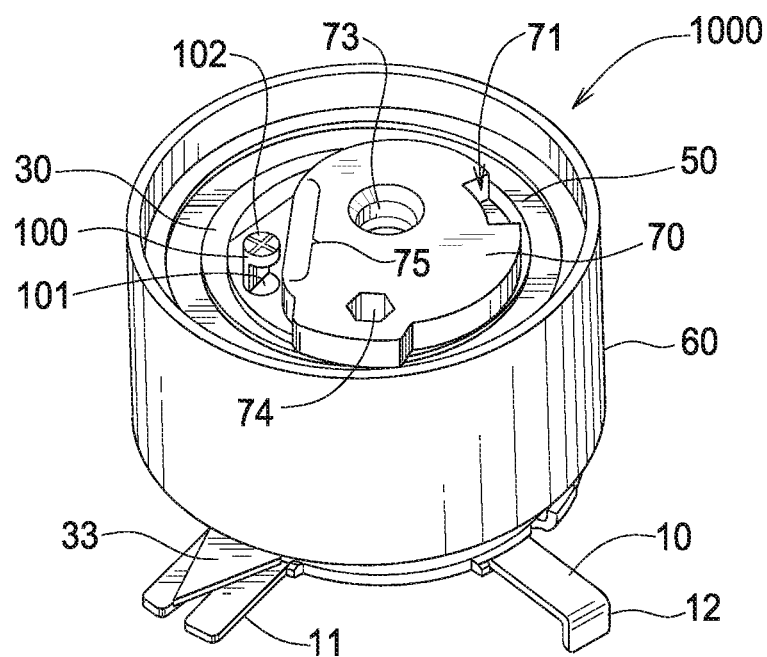
FIG. 1 is a top perspective view of the tensioner in a released position.

FIG. 1 is a top perspective view of the tensioner in a released position. Tensioner 1000 comprises a base 10, shaft 20, pivot arm 30, bearing 50 and pulley 60. Shaft 20 is press fit into base 10. Pivot arm 30 is pivotally engaged on an exterior of shaft 20. Bushing 90 is disposed on the exterior of the shaft between the shaft and the pivot arm to facilitate pivotal movement of the pivot arm.

The tensioner comprises three axis, pivot arm axis of rotation A-A, pulley axis of rotation B-B, and fastener axis C-C. An adjusting member rotates about axis A-A and C-C. The relationship of these rotational axis contribute to operation of the tensioner, which is to apply a load to a belt.

Pulley 60 is journalled to pivot arm 30 with a bearing 50. A bushing may be used in lieu of bearing 50 with equal success. End 41 of torsion spring 40 engages pivot arm 30. End 42 of torsion spring 40 engages base 10. Torsion spring 40 applies a torque to pivot arm 30 which in turn applies a force to a belt (not shown). Base 10 is fixed to a mounting surface with a fastener 120. Torsion spring 40 bears upon bushing 80 which prevents torsion spring 40 from resting upon base 10. Adjusting member 70 is disposed within shaft 20.

Tensioner 1000 may comprise an engine assembly condition or an operating condition. In FIG. 1, tensioner 1000 is shown in the engine assembly configuration. Stop indicator 33 is aligned with tab 11. Tab 11 extends from base 10. Stop indicator 33 extends radially from pivot arm 30. Pivot arm 30 is urged into this position by torsion spring 40. Rotary member 100 is shown in the released position.

Rotary member 100 engages a hole 32 in pivot arm 30. Rotary member 100 can be rotated within hole 32 using a tool such as a screwdriver. Rotary member 100 comprises a notch 101. Notch 101 is approximately half of the diameter of the cylindrical shaped member 100, but this dimension is not limiting and is only provided by way of example. Adjusting member 70 comprises a receiving slot 71 which cooperates with member 100.

In the operating configuration rotary member 100 engages slot 71 in a manner whereby member 100 serves as a stop to limit movement of pivot arm 30. Notch 101 comprises a width that is slightly larger than the thickness of the adjusting member portion it engages. Notch 101 further cooperates with portion 72 of adjusting member 70 such that when suitably positioned, notch 101 allows adjusting member 70 to rotate by allowing passage of portion 72 past rotary member 100 through notch 101. The radius of surface 72a from axis A-A is greater than the radius from axis A-A to the center of member 100, thereby allowing member 100, once rotated, to engage with slot 71 as a stop. Portion 75 is recessed radially from portion 72 which allows member 100 to be initially installed in hole 32. Unlike the prior art wherein a lock pin is removed during installation thereby creating waste, rotary member 100 remains a functional part of the device once the rotary member is actuated.

Fastener 120 extends through adjusting member 70 and shaft 20 to attach the tensioner to a mounting surface such as an engine (not shown). Fastener 120 clamps adjusting member 70 in position once secured to a mounting surface.

During installation of the tensioner, adjusting member 70 is rotated about fastener 120 thereby bringing pulley 60 into engagement with a belt (not shown). This is because the axis C-C of fastener 120 is offset from axis A-A. Axis A-A aligns with adjusting member 70 within hole 31. Adjusting member 70 rotates about axis A-A within shaft 20. Pivot arm 30 pivots about axis A-A.

In addition, rotary movement of pivot arm 30 about shaft 20 moves pulley axis of rotation B-B in an arc about axis A-A which gives the effect of laterally or radially displacing axis of rotation B-B with respect to axis A-A. Accordingly, pivot arm 30 pivots eccentrically relative to the adjusting member 70 as it rotates around member 70. The distance between the axis B-B and the longitudinal axis A-A of shaft 20 and adjusting member 70 provides the working eccentricity of the tensioner. By coupling pivot arm 30 to the eccentric adjusting member 70 during the installation procedure, the working eccentricity of pivot arm 30 is combined with the adjustment eccentricity of the eccentric adjusting member 70, thereby increasing the stroke of the tensioner.

Movement of axis B-B with respect to axis A-A causes torsion spring 40 to be loaded as the pulley 60 engages a belt. As pulley 60 engages the belt, torsion spring 40 in turn applies a load to the belt. As pivot arm 30 rotates stop indicator 33 is seen to move away from tab 11. This indicates a loaded condition of the piovt arm 30 and torsion spring, and thereby, loading of the belt. Loading the belt in this manner prevents the belt from ratcheting or slipping on sprockets (not shown) to which it is entrained.

Figure 2:
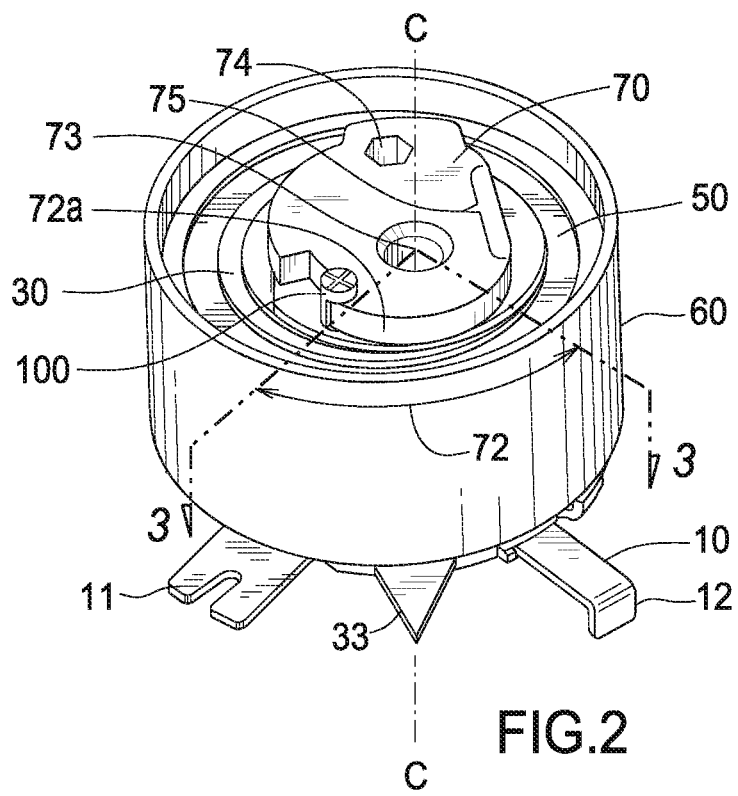
FIG. 2 is a top perspective view of the tensioner in a locked position.

FIG. 2 is a top perspective view of the tensioner in a locked position. During installation adjusting member 70, and thereby portion 72 and slot 71 rotate into and through cooperative alignment with notch 101 of rotary member 100. As a result of rotation of adjusting member 70 about axis C-C during installation, axis A-A moves in an arc about axis C-C. Pivot arm 30 moves to an installed position as shown by the position of stop indicator 33. Rotary member 100 is then rotated approximately 90 degrees with a tool such as a screwdriver. Engagement of rotary member 100 within slot 71 locks pivot arm 30 into the installed position, whereby member 100 acts as a stop to limit movement of pivot arm 30. Pivot arm 30 then has a range of movement that is constrained by the length of slot 71. During installation any appropriate tool can be engaged with receiving portion 74 to rotate adjusting member 70, for example, a ratchet drive.

Once the adjustment is complete, fastener 120 is then torqued down in its final position, thereby clamping adjusting member 70, shaft 20 and base 10 to the mounting surface.

Portion 12 extends in an axial direction and is configured to engage a receiving portion in a mounting surface. Portion 12 prevents base 10 from rotating during installation or during torquing of fastener 120.

Figure 3:
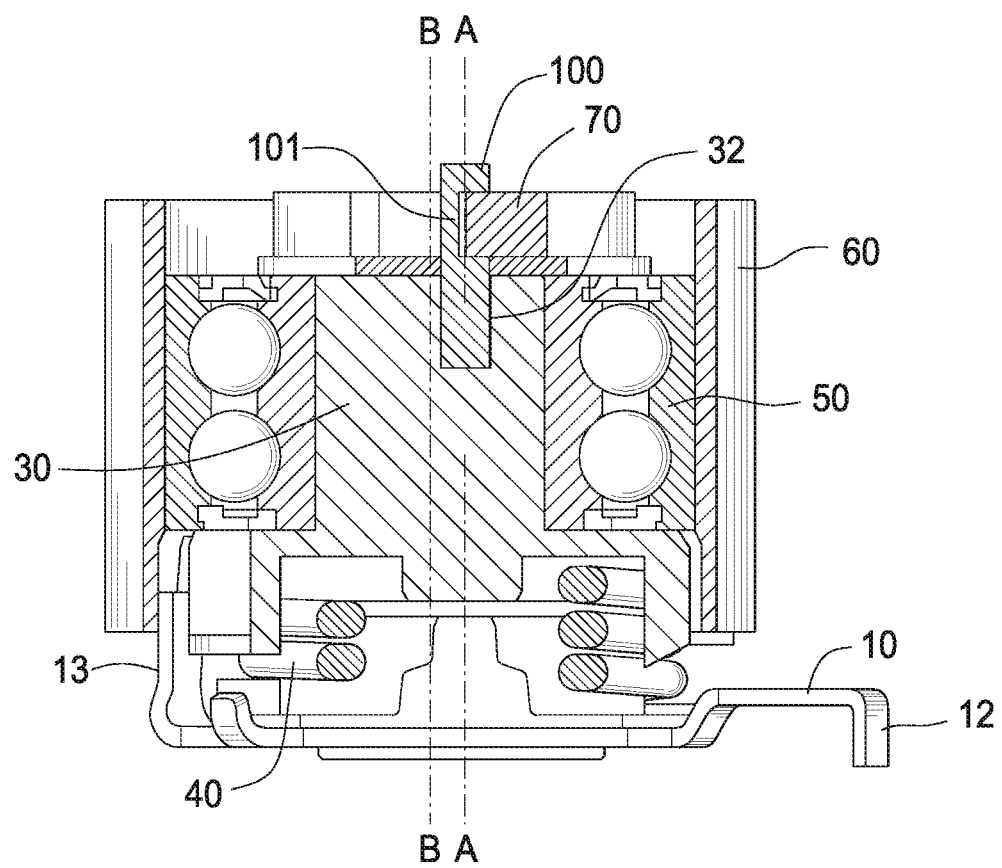
FIG. 3 is a cross-section A-A of the tensioner in FIG. 2.

FIG. 3 is a cross-section A-A of the tensioner in FIG. 2. Bearing 50 is press fit to pivot arm 30. Pulley is press fit to bearing 50. Pulley 60 may engage a timing belt used in an internal combustion engine (not shown).

Pivot arm 30 pivots about axis A-A. Pulley 60 rotates about axis B-B. Fastener 120 aligns with axis C-C, see FIG. 4. None of axis A-A, B-B, or C-C is colinear with the others; all are laterally offset from each other.

Figure 4:
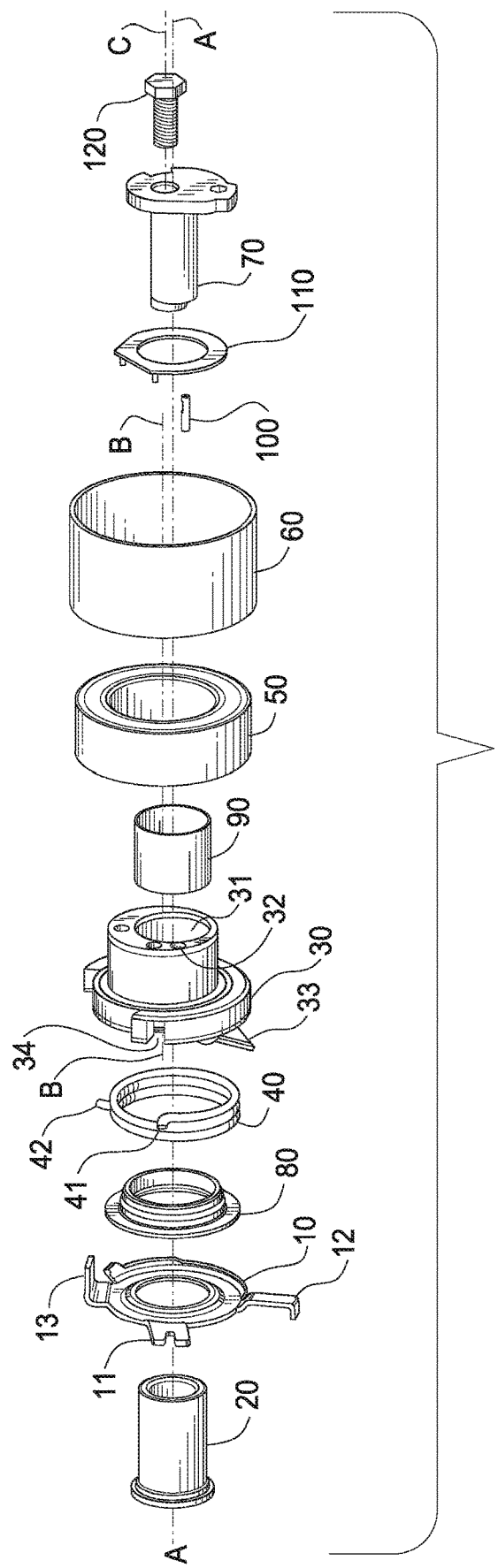
FIG. 4 is an exploded view of the tensioner.

FIG. 4 is an exploded view of the tensioner. End 41 of torsion spring 40 engages slot 34. End 42 of torsion spring 40 engages portion 13. Torsion spring 40 is nested within bushing 80. Bushing 80 rests upon base 10. Torsion spring 40 rests upon bushing 80.

Low friction bushing 110 is disposed between eccentric arm 30 and adjusting member 70, thereby facilitating rotation of adjusting member 70 during installation. Bushing 110 also facilitates movement of eccentric arm 30 during operation of the tensioner.

Although a form of the invention has been described herein, it will be obvious to those skilled in the art that variations may be made in the construction and relation of parts and method without departing from the spirit and scope of the invention described herein.

We claim:

1. A tensioner comprising:
   a base having a shaft;
   an adjusting member rotatably engaged within the shaft;
   a pivot arm pivotally engaged with a shaft exterior;
   a torsion spring engaged between the base and the pivot arm;
   a pulley journalled to the pivot arm, a pulley axis of rotation B-B that is laterally offset from a pivot arm pivot axis A-A;
   the adjusting member configured for rotation about a fastener having an axis C-C, the axis C-C is laterally offset from the axis A-A; and
   a rotary member rotationally engaged with the pivot arm, the rotary member in a first position allows rotation of the adjusting member about the fastener, and upon rotation of the rotary member to a second position the rotary member limits movement of the pivot arm in a predetermined range with respect to the adjusting member.

2. The tensioner as in claim 1, wherein the rotary member comprises a notch for cooperatively engaging the adjusting member.

3. The tensioner as in claim 1, wherein the adjusting member comprises a tool receiving portion.

4. The tensioner as in claim 1 further comprising a fastener having an axis C-C, the adjusting member rotatable about axis C-C.

\* \* \* \* \*